United States Patent
Wickramanayake et al.

(10) Patent No.: US 9,050,579 B1
(45) Date of Patent: Jun. 9, 2015

(54) METHOD FOR THE PRODUCTION OF FABRICATED HOLLOW MICROSPHEROIDS

(71) Applicants: Shan Wickramanayake, Pittsburgh, PA (US); David R. Luebke, Bethel Park, PA (US)

(72) Inventors: Shan Wickramanayake, Pittsburgh, PA (US); David R. Luebke, Bethel Park, PA (US)

(73) Assignee: U.S. Department of Energy, Washington, DC (US)

( * ) Notice: Subject to any disclaimer, the term of this patent is extended or adjusted under 35 U.S.C. 154(b) by 518 days.

(21) Appl. No.: 13/622,001

(22) Filed: Sep. 18, 2012

(51) Int. Cl.
  *B01J 13/02* (2006.01)
  *B01J 13/06* (2006.01)

(52) U.S. Cl.
  CPC .. *B01J 13/02* (2013.01); *B01J 13/06* (2013.01)

(58) Field of Classification Search
  CPC ............ B01J 13/02; B01J 13/04; B01J 13/06; B01J 13/12; B01J 13/20; B01J 13/203
  USPC .......................................................... 264/41
  See application file for complete search history.

(56) References Cited

PUBLICATIONS

Lakshmi et al., "Preparation and characterization of ionic liquid polymer microspheres [PEEKWC/DMF/CYPHOS IL 101] using the phase-inversion technique," Separ. Purif. Technol. (2012), doi:10.1016/j.seppur.2012.01.045.

Wickramanayake et al., "Fabrication of hollow, spherical polymeric micropillows using a dual layer spinneret," Journal of Applied Polymer Science 121(5) (2011).

Harran et al., "Parametric Study of Acoustic Excitation-Based Glycerol-Water Microsphere Fabrication in Single Nozzle Jetting," Journal of Manufacturing Science and Engineering 132 (2010).

Kim et al., "Microspheres for Drug Delivery," Biomems and Biomedical Nanotechnology, vol. 1: Biological and Biomedical Nanotechnology 2006, XXII, ISBN 978-0-387-25563-7.

*Primary Examiner* — Joseph S Del Sole
*Assistant Examiner* — John Robitaille
(74) *Attorney, Agent, or Firm* — James B. Potts; Brian J. Lally; John T. Lucas

(57) ABSTRACT

The method relates to the fabrication of a polymer microspheres comprised of an asymmetric layer surrounding a hollow interior. The fabricated hollow microsphere is generated from a nascent hollow microsphere comprised of an inner core of core fluid surrounded by a dope layer of polymer dope, where the thickness of the dope layer is at least 10% and less than 50% of the diameter of the inner core. The nascent hollow microsphere is exposed to a gaseous environment, generating a vitrified hollow microsphere, which is subsequently immersed in a coagulation bath. Solvent exchange produces a fabricated hollow microsphere comprised of a densified outer skin surrounding a macroporous inner layer, which surrounds a hollow interior. In an embodiment, the polymer is a polyimide or a polyamide-imide, and the nonsolvent in the core fluid and the coagulation bath is water. The fabricated hollow microspheres are particularly suited as solvent supports for gas separation processes.

20 Claims, 4 Drawing Sheets

METHOD FOR THE PRODUCTION OF FABRICATED HOLLOW MICROSPHEROIDS

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The method relates to the fabrication of a polymer microspheres comprised of an asymmetric layer surrounding a hollow interior. The fabricated hollow microsphere is generated in a dry-wet process using a polymer dope comprised of from about 8 weight percent (wt. %) to about 25 wt. % of a polymer, from about 65 wt. % to about 87 wt. % of a solvent, and from about 5 wt. % to about 10 wt. % of a volatile, where the polymer dope surrounds a core fluid is comprised of a non-solvent and about 80 wt. % solvent.

BACKGROUND

The use of polymers in separation processes is well known in a variety of industries from water treatment to industrial gas separations. The polymers generally accomplish separation through a solution-diffusion mechanism when utilized as a non-porous material, and through molecular sieving or Knudson diffusion when utilized as porous materials. Additionally, polymers have been fabricated for a combination of porous and non-porous behaviors with a morphology characterized as asymmetric. An asymmetric polymer material is generally characterized by a dense thin film providing high selectivity, and supported by a porous polymeric network having high permeability. In polymer membranes utilized for gas separations, the asymmetric morphology is advantageous in that it allows a component selectively passed through the dense layer to proceed through the lower structure with minimized resistance.

In polymer membranes utilizing an asymmetric morphology, it is important that the preferred component diffuse through the dense layer at a sufficient flow rate, which makes it desirable to keep the thickness of the dense layer as small as possible. Additionally, typically the dense film cannot have a porous surface in order to preserve the inherent selectivity of the dense film in gas separation operations. These two requirements present significant difficulty in connection with the fabrication of the asymmetric morphologies, since dense films of a thickness of 1 micron or less can rarely be manufactured without flaws. Typically, the exceedingly small dimensions of gas molecules make the presence of even Angstrom size pores in the separation layer unacceptable. In order to combat this requirement for defect-free dense films, polymer structures are also utilized as supporting contactors between a gaseous mixture and a supported carrier or sorbent. Unlike the purely polymeric membranes, the sorbent-supporting polymer mainly provides structural support, since the composite material relies on the supported material to provide selectivity.

One particularly valuable geometry for the support and confinement of liquid carriers or solvents is the hollow polymeric microsphere. Spheres with hollow interiors play an important role in microencapsulation and have been extensively used in medical, biological, pharmaceutical and industrial applications. They offer the advantage of large internal payload space and high specific surface area, and the investigation of hollow polymer microspheres with different and controllable shell thickness has become increasingly important as a result of their superior mechanical properties and release behavior in medical and pharmaceutical applications. However, generally the hollow polymer microspheres fabricated for these applications are characterized by a densified outer polymer skin surrounding the hollow interior, rather than the asymmetric geometries desired for applications such as gas separations. In many applications, the hollow polymer microspheres are fabricated around a core fluid which is essentially inert with respect to the polymer dope forming the outer shell, so that the densified outer shell forms with limited interference. As a result, the hollow microspheres formed by these processes have limited use in applications such as gas separations.

It would be advantageous to provide a process whereby polymer microspheres comprised of an asymmetric layer surrounding a hollow interior could be fabricated, so that the support and confinement of liquid carriers or solvents could be accommodated within a spherical geometry incorporating the type of layer desired for polymeric membranes. It would be additionally advantageous if the asymmetric geometry of the hollow microsphere resulted from specified solvent-non-solvent relationships within the core fluid, so that the advantages of a core fluid in fabricating the hollow interior could be utilized without interference in the formation of the asymmetric layer.

Ionic liquids have been encapsulated in polymeric microspheres through the preparation of a polymer-solvent-ionic liquid dope, and the immersion of contiguous drops of the dope into a coagulation bath in order to produce generally asymmetric surrounding layers. See Lakshmi et al., "Preparation and characterization of ionic liquid polymer microspheres [PEEKWC/DMF/CYPHOS IL 101] using the phase-inversion technique," *Separ. Purif. Technol.* (2012), doi: 10.1016/j.seppur.2012.01.045. This methodology constrains both polymer and ionic liquid concentrations within relatively tight margins in order to control the viscosity of the resulting dope and allow for formation of the contiguous dope spheroid under the method employed, and the absence of a core fluid generates limited control over the hollow geometry. Additionally, polymer microspheres comprised of an asymmetric layer have been fabricated using a volatizing core fluid under controlled temperature conditions to avoid microsphere collapse during fabrication. See Wickramanayake et al., "Fabrication of hollow, spherical polymeric micropillows using a dual layer spinneret," Journal of Applied Polymer Science 121(5) (2011). It would be advantageous to provide a process whereby polymer microspheres comprised of an asymmetric layer surrounding a hollow interior could be fabricated in a logistically simpler wet-dry process through the control of core fluid and polymer dope compositions, as well as the resulting interactions between the polymer dope, the core fluid, and a surrounding environment during the formation.

Disclosed here is a method for the production of a fabricated hollow microsphere comprised of a densified outer layer surrounding a porous polymer network, where the porous polymer network surrounds a hollow interior. The resulting geometry of the fabricated hollow microsphere results from interactions between a polymer dope, a core fluid, and a gaseous environment when respective compositions, diameters, and dope thicknesses are combined with a controlled exposure time to a gaseous environment, and factors as specified in this disclosure are observed. The fabricated hollow microsphere may be fabricated in a wet-dry process utilizing a triple orifice, dual layer spinneret, and the fabricated hollow microspheres generated may be effectively utilized as liquid sorbent supports.

These and other objects, aspects, and advantages of the present disclosure will become better understood with reference to the accompanying description and claims.

SUMMARY

The method disclosed generates a fabricated hollow microsphere comprised of a densified outer layer surrounding a porous polymer network, where the porous polymer network surrounds a hollow interior. The method forms a nascent hollow microsphere comprised of an inner core surrounded by a dope layer, where the nascent hollow microsphere has a total diameter of between about 200 microns and 3000 microns, and where the dope layer has a layer thickness greater than about 10% and less than about 50% of the inner core diameter.

The inner core is comprised of a core fluid, where the core fluid is comprised of a first non-solvent and a first solvent, where the first solvent comprises greater than about 80 wt. % of the core fluid. The dope layer is comprised of a polymer dope comprised of from about 8 wt. % to about 25 wt. % of a polymer, from about 65 wt. % to about 87 wt. % of a second solvent and from about 5 wt. % to about 10 wt. % of a volatile. The volatile has a vapor pressure greater than about 100 mm Hg at 25° C., and the dope layer has a viscosity less than about 40 poise at 25° C. The relatively low viscosity of the polymer dope allows spreading over the inner core. In an embodiment, the first and second solvent are common.

The nascent hollow microsphere is exposed to a gaseous environment for at least 0.15 seconds and less than 0.5 seconds. The relative dimensions of the nascent hollow microsphere, the vapor pressure of the volatile, and the exposure time as specified result in some portion of the volatile driving out of the dope layer during the exposure, generating a polymer-rich outer skin around the dope layer. The outer skin is a vitrified, relatively viscous, layer. Concurrent with the volatile driving out, some degree of phase separation occurs at the interface between the inner core and the dope layer. The phase separation is somewhat delayed by the first solvent in the core fluid. Following exposure to the gaseous atmosphere, the vitrified hollow microsphere is immersed in a coagulation bath comprised of a second non-solvent. Immersion in the coagulation bath prompts a solvent exchange and generates the fabricated hollow microsphere. In an embodiment, the first non-solvent of the core fluid and the second non-solvent of the coagulation bath are water. In another embodiment, the core fluid is comprised of less than about 25 wt. % of an ionic liquid, and the fabricated hollow microsphere is comprised of pockets of the ionic liquid within the macroporous inner layer.

In an embodiment, the nascent hollow microsphere is formed using a triple orifice, dual layer spinneret issuing a stream of core fluid through a central bore, an annular stream of polymer dope through a first annulus, and a gaseous stream through a second annulus. Contact between the annular stream of the polymer dope and the stream of core fluid generates a drag on the forming droplet of the core fluid, and adjustment of the gas flow rate and the polymer dope flow rate allow production of the nascent hollow microsphere. During the droplet growth, the viscosity limitations of the polymer dope are such that a forming dope layer tends to spread over the surface of the forming inner core, and the volatile content of the polymer dope is such that the sufficiently low viscosity is maintained until subsequent detachment of the droplet from the triple orifice nozzle.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process for the fabrication of a polymer microspheres comprised of an asymmetric layer surrounding a hollow interior.

The method disclosed generates a fabricated hollow microsphere by forming a nascent hollow microsphere having a diameter from about 200 microns to about 3000 microns, where the nascent hollow microsphere is comprised of an inner core of core fluid surrounded by a dope layer of polymer dope. The core fluid is comprised of a solvent/non-solvent mixture, and the polymer dope is comprised of a polymer, a solvent, and a volatile. The nascent hollow microsphere is exposed to a gaseous environment, and the specified compositions and geometric relationships result in some portion of the volatile driving out of the dope layer, forming a thin vitrified outer skin. Concurrently, phase separation occurs at the interface between the inner core and the dope layer, generating variations in polymer concentration. The presence of a solvent in both the core fluid and the polymer dope combined with limitations on the exposure to the gaseous environment generate a vitrified hollow microsphere comprised of the thin vitrified outer skin surrounding a dope layer with varied polymer concentration, surrounding a core of the core fluid.

The vitrified hollow microsphere is subsequently immersed in a coagulation bath comprised of a non-solvent having a specified kinetic diameter, generating a solvent exchange in the vitrified hollow microsphere. The solvent exchange produces a fabricated hollow microsphere comprise of a densified outer skin surrounding a macroporous inner layer, which surrounds a hollow interior. In an embodiment, the polymer is a polyimide or a polyamide-imide, and the non-solvent in the core fluid and the coagulation bath is water.

The fabricated hollow microspheres are particularly suited as solvent supports for gas separation processes. The fabricated hollow microspheres may be loaded with a liquid solvent using various means such as soaking and employed in typical separation operations such as temperature/pressure swing processes. In an embodiment, the core fluid is comprised of an ionic liquid, such that the macroporous inner layer of the fabricated hollow microsphere is comprised of a polymer network surrounding pockets of the ionic liquid. In another embodiment, the fabricated hollow microspheres impact a free surface of the coagulation bath during the dry-wet process, generating an oblate spheroid for increased durability during exposure to fluctuating pressures.

Figure 1:
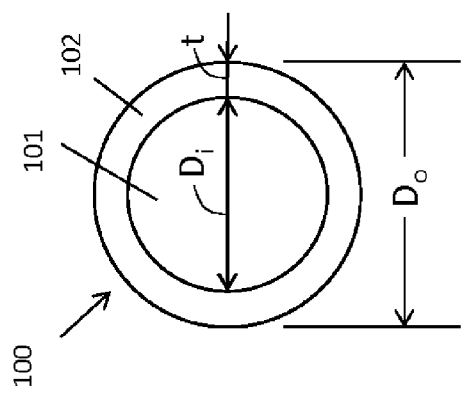
FIG. 1 illustrates a nascent hollow microsphere.

FIG. 1 illustrates a nascent hollow microsphere generally at 100. Nascent hollow microsphere 100 is comprised of an inner core 101 surrounded by a dope layer 102. Additionally, the nascent hollow microsphere has a total diameter $D_o$ of greater than about 200 microns and less than about 3000 microns. In an embodiment, total diameter $D_o$ is less than about 500 microns. Further, inner core 101 an inner core diameter $D_i$, and dope layer 102 has a layer thickness t greater than about 10% and less than about 50% of the inner core diameter $D_i$.

Inner core 101 is comprised of a core fluid, where the core fluid is comprised of a first non-solvent and a first solvent, where the first solvent is greater than about 80 wt. % of the core fluid. Dope layer 102 is comprised of a polymer dope. The polymer dope is comprised of from about 8 wt. % to about 25 wt. % of a polymer, from about 65 wt. % to about 87 wt. % of a second solvent and from about 5 wt. % to about 10 wt. % of a volatile. The volatile has a vapor pressure greater than about 100 mm Hg at 25° C. Additionally, the polymer is poorly soluble in the first non-solvent of the core fluid, and the polymer is soluble in the first solvent of the core fluid, the second solvent of the polymer dope, and the volatile of the polymer dope. Additionally, the second solvent of the polymer dope is miscible with the first non-solvent and the first solvent of the core fluid, and miscible with the volatile of the polymer dope. Further, dope layer 102 has a viscosity less than about 40 poise at 25° C., in order to allow the relatively low viscosity polymer dope to spread over inner core 101.

Within this disclosure, the term "poorly soluble" with respect to a particular solute and solvent means an equilibrium concentration of less than 100 parts-per-million solute in a solution of the solute and the solvent. For example, within this disclosure, when a polymer is poorly soluble in a non-solvent, the equilibrium concentration of the polymer in a polymer/non-solvent solution is less than 100 parts-per-million.

Within this disclosure, the term "soluble" with respect to a particular solute and solvent means an equilibrium concentration of greater than 1 wt. % solute in a solution of the solute and a solvent. For example, within this disclosure, when a polymer is soluble in a solvent, the equilibrium concentration of the polymer in a polymer/solvent solution is greater than 1 wt. % polymer. Within this disclosure, the term "miscible" means the property of liquids to mix in all proportions, forming a homogeneous solution.

Within this disclosure, the term "polymer" means a naturally occurring or synthetic compound consisting of large molecules made up of a linked series of repeated simple monomers.

Both the inner core 101 and nascent hollow microsphere 100 are spheroid shapes. Within this disclosure, "spheroid shape" means a volume enclosed by a three-dimensional shape having a sphericity greater than 0.6, where the sphericity is the ratio of the surface area of a sphere having the same volume as the spheroid shape to the surface area of the spheroid shape. Additionally, within this disclosure, the "inner core diameter $D_i$" means a Sauter Mean Diameter of the inner core, where the Sauter Mean Diameter of the inner core is the diameter of a sphere having the same volume-to-surface area ratio as the spheroid shape of the inner core. Similarly, within this disclosure, the "total diameter $D_o$" means a Sauter Mean Diameter of the nascent hollow microsphere, where the Sauter Mean Diameter of the nascent hollow microsphere is the diameter of a sphere having the same volume-to-surface area ratio as the spheroid shape of the nascent hollow microsphere.

Within the method, nascent hollow microsphere 100 is exposed to a gaseous environment for at least 0.15 seconds and less than 0.5 seconds. In an embodiment, the exposure occurs for between 0.15 seconds and less than 0.35 seconds, and in a further embodiment, the exposure occurs for between 0.20 and 0.30 seconds. The gaseous environment is inert relative to the dope layer, and a partial pressure of the volatile in the gaseous atmosphere is less than the vapor pressure of the volatile. The relative dimensions of the nascent hollow microsphere, the vapor pressure of the volatile, and the exposure time as specified result in some portion of the volatile driving out of the dope layer during the exposure, generating a polymer-rich outer skin around the dope layer. The outer skin is a vitrified layer, relatively viscous, and generally does not exhibit the flow properties associated with liquids.

Concurrent with the volatile driving out, some degree of phase separation occurs at the interface between the inner core and the dope layer, as some degree of exchange between the second solvent in the dope layer and the first non-solvent in the inner core occurs. The first solvent in the core fluid is utilized to delay the phase separation around the inner surface. The first solvent mitigates a rapid diffusion of the first non-solvent from the core fluid, which can lead to substantially complete phase separation of the polymer dope during exposure to the gaseous environment. Such rapid diffusion eliminates or greatly reduces the ability to generate a vitrified hollow microsphere and subsequently a fabricated hollow microsphere. As discussed, this is avoided through a core fluid which is comprised of greater than about 80 wt. % first solvent. Generally, as the amount of the second solvent in the polymer dope increases, the amount of the first solvent in the core fluid may be decreased. In an embodiment, a ratio of the wt. % of the first solvent in the core fluid to the wt. % of the second solvent in the polymer dope is greater than about 1.05. Generally, it may be helpful if the first solvent comprises about 10 wt. % more of the core fluid than the weight percent comprised by the second solvent in the polymer dope.

Figure 2:
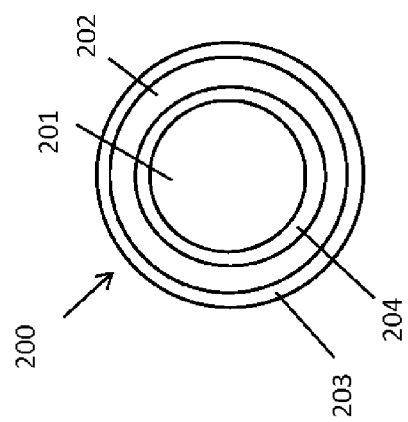
FIG. 2 illustrates a vitrified hollow microsphere.

Following exposure to the gaseous atmosphere, vitrified hollow microsphere 200 results, as illustrated at FIG. 2. Vitrified hollow microsphere 200 is comprised of outer skin 203 surrounding layer 202, and further comprised of inner wall 204 surrounding core 201. As is understood, outer skin 203, layer 202, inner wall 204, and core 201 have compositions and properties resulting from the interactions of dope layer 102 and the gaseous environment as well the interactions of dope layer 102 and inner core 101 which occur during the gaseous exposure.

Following formation of the outer skin and inner wall, vitrified hollow microsphere 200 is immersed in a coagulation bath. The coagulation bath is comprised of a second non-solvent. The polymer comprising the polymer dope is poorly soluble in the second non-solvent, and the second non-solvent is miscible with the second solvent of the polymer dope and the first solvent of the inner core. Further, the second non-solvent has a kinetic diameter less than about 0.5 nanometers (nm). Immersion in the coagulation bath prompts a solvent exchange, and the first and second solvents diffuse from vitrified hollow microsphere 200 into the coagulation bath as the second non-solvent diffuses from the coagulation bath into vitrified hollow microsphere 200.

In an embodiment, the second solvent of the polymer dope is comprised of the first solvent of the core fluid, and the second non-solvent of the coagulation bath is comprised of the first non-solvent of the core fluid. For example, the second solvent and the first solvent may be N-methyl pyrollidone (NMP), and the second non-solvent and the first non-solvent may be water.

Figure 3:
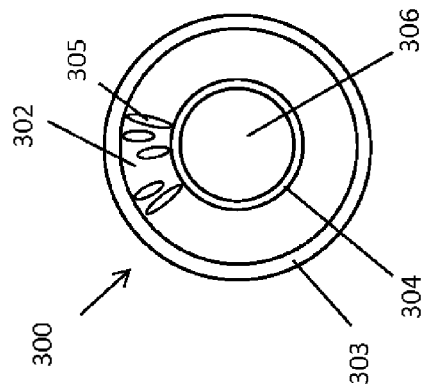
FIG. 3 illustrates a fabricated hollow microsphere.

When vitrified hollow microsphere 200 enters the coagulation bath, solvent exchange reduces the concentration of the first and second solvent and increases the concentration of the polymer in outer skin 203, layer 202, and inner wall 204, resulting in precipitation of the polymer. The higher local polymer concentration of outer skin 203 generates a densified layer, and separation of the polymer and the second non-solvent within layer 202 causes the polymer to precipitate in a porous polymer network. Additionally, the relatively polymer-rich inner wall 204 generates an additional dense layer, which acts to prevent or mitigate the migration of polymer strands into the core. The solvent exchange generated by the coagulation bath acts to generate fabricated hollow microsphere 300, illustrated at FIG. 3. Fabricated hollow microsphere 300 is comprised of densified outer layer 303 surrounding a porous polymer network 302 comprised of pores, such as pore 305. Additionally, dense inner wall 304 generally separates the porous polymer network 302 from a hollow interior 306 within fabricated hollow microsphere 300. Correspondingly, fabricated hollow microsphere 300 may be described as an asymmetric membrane surrounding a hollow interior. The resulting geometry of fabricated hollow microsphere 300 results from interactions between the polymer dope, the core fluid, and the gaseous environment when the respective compositions, the total diameter of the nascent hollow microsphere, the inner diameter of the inner core diameter, the dope layer thickness relative to the inner core diameter, the exposure time to the gaseous environment, the kinetic diameter of the second non-solvent, and other specified factors are observed.

The limited kinetic diameter of the second non-solvent ensures that a solvent exchange as opposed to a solvent extraction occurs in the coagulation bath, avoiding collapse of the fabricated hollow microsphere. If a second non-solvent with a larger molar volume is used, diffusion of the second non-solvent from the coagulation bath is difficult and solvent extraction tends to occur. A solvent extraction tends to not remove substantially all of the solvent, which in turn tends to make the porous polymer less rigid. Eventually, this can lead to collapse of the spheroid.

Additionally, within this disclosure, the size of a pore such as pore 305 is not limiting. Pore 305 may be a microvoid or a macrovoid as those terms are used the art, or may have dimensions falling between those designations. Further, the presence or absence of defects in densified outer layer 303 is not limiting. In certain applications a defect-free thin film may be advantageous; however, the fabricated hollow spheroid produced by the method disclosed may or may not have defects present.

In an embodiment, either the polymer dope or the core fluid is additionally comprised of a complexing additive in order to increase the porosity of porous polymer network 302. Addition of the complexing additive affects the kinetics and thermodynamics parameters leading to a change in membrane morphology by changing the interaction between solvent and polymer, resulting in the formation of salt-solvent complexes which are relatively unstable in the presence of the second non-solvent and changing the morphology to sponge-like form. See e.g., Razdan et al., "Novel membrane processes for separation of Organics," *Current Science* 85(6) (2003), among others. As non-limiting examples, in an embodiment where the second non-solvent is water, lithium nitrate ($LiNO_3$), lithium chloride (LiCl), or methanol may be utilized as the complexing additive. Typically, the complexing additive is present at less than about 10 wt. % of the polymer dope or core fluid, and more typically less than about 5 wt. %.

In certain embodiments, the polymer is a polyimide such as those known commercially as MATRIMID or UPILEX, a polyamide-imide such as known commercially as TORLON, or a biopolymer such as cellulose acetate. The choice of polymer is not limiting within the method disclosed, provided that the polymer is poorly soluble in the first non-solvent and the second non-solvent, soluble in the first solvent and the second solvent, and soluble in the volatile. The second solvent must readily dissolve the polymer, so that the polymer dope is a homogenous solution. Homogeneity of the polymer dope may be achieved by various methods known in the art, for example stirring and de-aeration. In an embodiment, the first solvent and the second solvent are comprised of NMP, Tetrahydrofuran (THF), or mixtures thereof. In another embodiment, the first non-solvent and the second non-solvent are comprised of water.

Those skilled in the art recognize that the acceptable dope compositions within the ranges disclosed here may be determined through trial and error, pre-existing knowledge, or through techniques such as cloud point analysis. Techniques are known for cloud point determination in systems such as that disclosed here, where the interaction between multiple components in a dope may not be fully represented by standard ternary diagram type representations. See e.g., Boom et al., "Equilibrium Thermodynamics of a Quaternary Membrane-Forming System with Two Polymers", *Macromolecules* vol. 27 (1994).

In a further embodiment, the core fluid is further comprised of an ionic liquid. In this embodiment, the core fluid is comprised of less than about 25 wt. % of the ionic liquid, and the polymer is poorly soluble in the ionic liquid. For ionic liquids with relatively large molar volumes or higher viscosities, it may be advantageous to incorporate the ionic liquid into the core fluid, as opposing to infusing the ionic liquid after the fabricated hollow microsphere has been formed. For example, it may be advantageous to incorporate the ionic liquid into the core fluid when the molar volume is roughly 300 $cm^3$/mol or more, or when the viscosity of the ionic liquid is greater than about 50 centipoise. Here, the term "ionic liquid" means a nonpolymeric salt comprising an organic cation and any variety of anions that is reasonably fluid at temperatures under about 100° C. The salt may contain monovalent or polyvalent anions or cations, and may be a single salt or a mixture of salts.

Figures 4, 5:
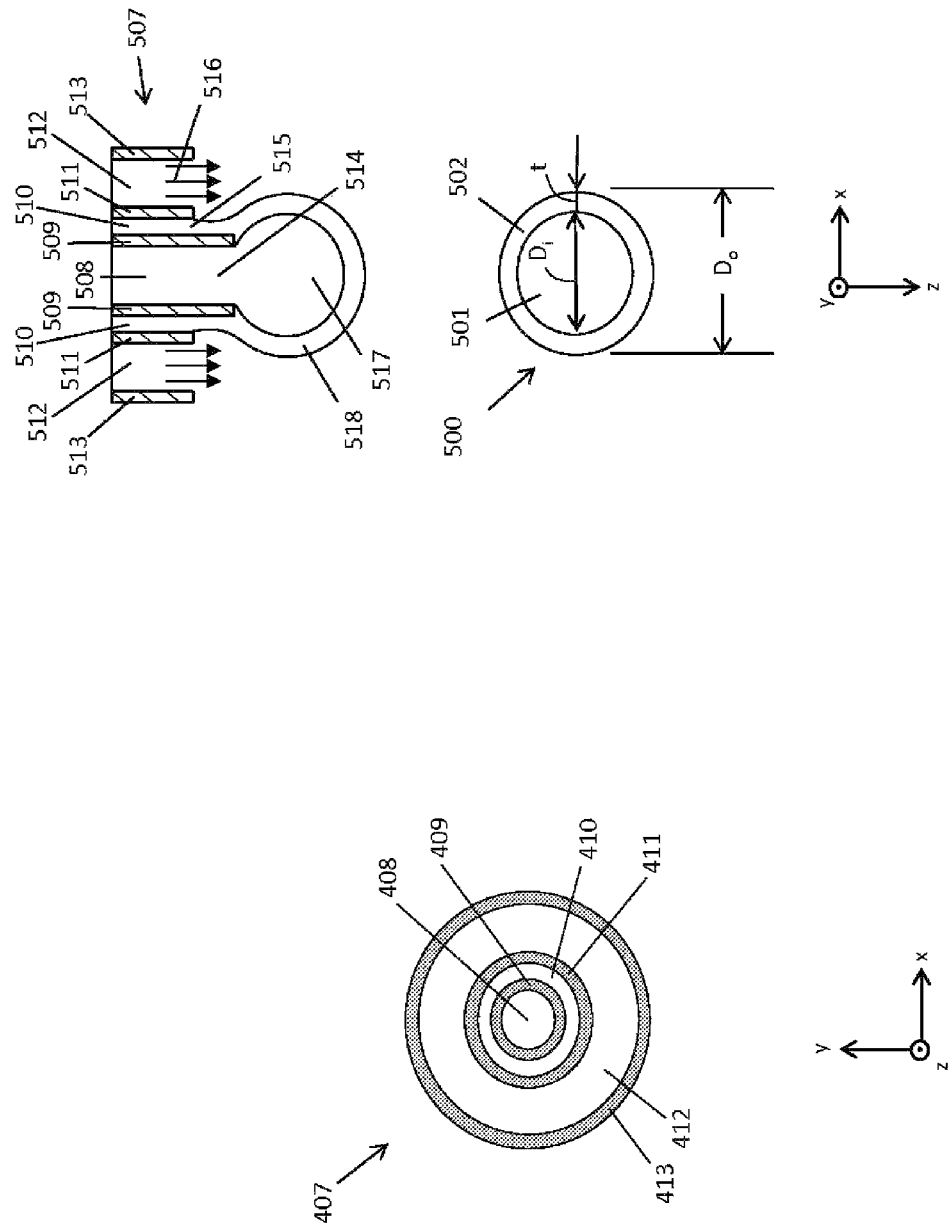
FIG. 4 illustrates a triple orifice, dual layer spinneret.
FIG. 5 illustrates a triple orifice, dual layer spinneret utilized for the fabrication of a nascent hollow microsphere.

In an embodiment, the nascent hollow microsphere is formed using a triple orifice, dual layer spinneret, illustrated in an overhead view at FIG. 4 as triple orifice nozzle 407. Triple orifice nozzle 407 is comprised of central bore 408, where central bore 408 is a flow opening bounded by inner wall 409. First annulus 410 is an annular flow opening, and bounded by inner wall 409 and middle wall 411, as illustrated. Additionally, second annulus 412 is an annular flow opening, and bounded by middle wall 411 and outer wall 413, as illustrated. For reference, triple orifice nozzle 407 is illustrated with respect to the coordinate system indicated, where a positive direction of the z-axis proceeds out of the page. In an embodiment, central bore 408 is a substantially circular opening having a diameter between about 100 microns (μm) and 500 μm, first annulus 410 is a substantially annular opening having an inner diameter between about 350 μm and 850 μm and an outer diameter between about 900 μm and 1500 μm, and second annulus 412 is a substantially annular opening having an inner diameter between about 1100 μm and 1700 μm and an outer diameter between about 1600 μm and 2400 μm. In a further embodiment, central bore 408 has a diameter of about 300 µm, first annulus 410 has an inner diameter of about 600 µm and an outer diameter of about 1200 µm, and second annulus 412 has an inner diameter of about 1500 µm and an outer diameter of about 2000 µm.

Triple orifice nozzle 407 may be utilized to form nascent hollow microspheres as illustrated at FIG. 5. FIG. 5 illustrates triple orifice nozzle 407 generally at 507 and rotated 90 degrees, as indicated by the common reference system of FIG. 5, where following the rotation a positive direction of the y-axis proceeds out of the page. FIG. 5 illustrates triple orifice nozzle 507 with central bore 508, inner wall 509, first annulus 510, middle wall 511, second annulus 512, and outer wall 513. Triple orifice nozzle 507 is utilized to form the nascent hollow microsphere by issuing a stream of the core fluid 514 through central bore 508, issuing an annular stream of polymer dope 515 through first annulus 510, and further issuing a gaseous stream 516 through second annulus 512.

A stream of core fluid 514 issues through central bore 508 at a core fluid flow rate, and undergoes stable drop growth on exiting through central bore 508, as illustrated. The core fluid flow rate is sufficiently limited so that jetting does not occur during the exit. Simultaneously, an annular stream of the polymer dope 515 issues through first annulus 510 at a polymer dope flow rate, where the polymer dope flow rate is greater than the core fluid flow rate. Contact between the annular stream of the polymer dope and the stream of core fluid generates a drag on the forming droplet of the core fluid. Concurrently, a gaseous stream 516 issues through second annulus 512 and a gas flow rate, and generates drag force on the polymer dope. The droplet comprised of the forming inner core 517 and the forming dope layer 518 continues to grow until a net force acting on the droplet exceed zero. See e.g., Umbanhowar et al., "Monodisperse Emulsion Generation via Drop Break Off in a Coflowing Stream," *Langmuir* 16 (2000), among many others. During the droplet growth, the viscosity limitations of the polymer dope are such that forming dope layer 518 tends to spread over the surface of forming inner core 517, and the volatile content of the polymer dope is such that the sufficiently low viscosity is maintained until subsequent detachment of the droplet from triple orifice nozzle 507.

The relative polymer dope flow rate and gas flow rate may be adjusted such that, following droplet detachment from triple orifice nozzle 507, the nascent hollow microspheres of this disclosure are generated, such as nascent hollow microsphere 500 at FIG. 5. Nascent hollow microsphere 500 is a droplet which has detached from triple orifice nozzle 507, and is comprised of inner core 501 surrounded by dope layer 502. Nascent hollow microsphere 500 has a total diameter $D_o$ of greater than about 200 microns and less than about 3000 microns. In an embodiment, nascent hollow microsphere 500 has a total diameter $D_o$ of less than about 500 microns. Additionally, inner core 501 has an inner core diameter $D_i$, and dope layer 502 has a layer thickness t greater than about 10% and less than about 50% of the inner core diameter $D_i$. In an embodiment where the second annulus 510 has an outer radius of less than about 1000 microns, the polymer dope flow rate and the gas flow rate are maintained such that the polymer dope flow rate is at least 20 ml/h, and the gas flow rate is equivalent to at least 1 standard liter per minute (SLPM) at a temperature of 25° C. and a pressure of 1 atmosphere.

The gaseous stream has a total moisture content of less than about 0.001%, and is inert with respect to the polymer dope. In an embodiment, the gaseous stream is substantially a $N_2$ gas. In another embodiment, the gaseous stream is comprised of the inert gas and a solvent vapor, where the solvent vapor has a vapor pressure less than 0.6 millibar at 25° C. Inclusion of solvent vapor in the gaseous stream assists in continuous nascent hollow microsphere production.

Figure 6:
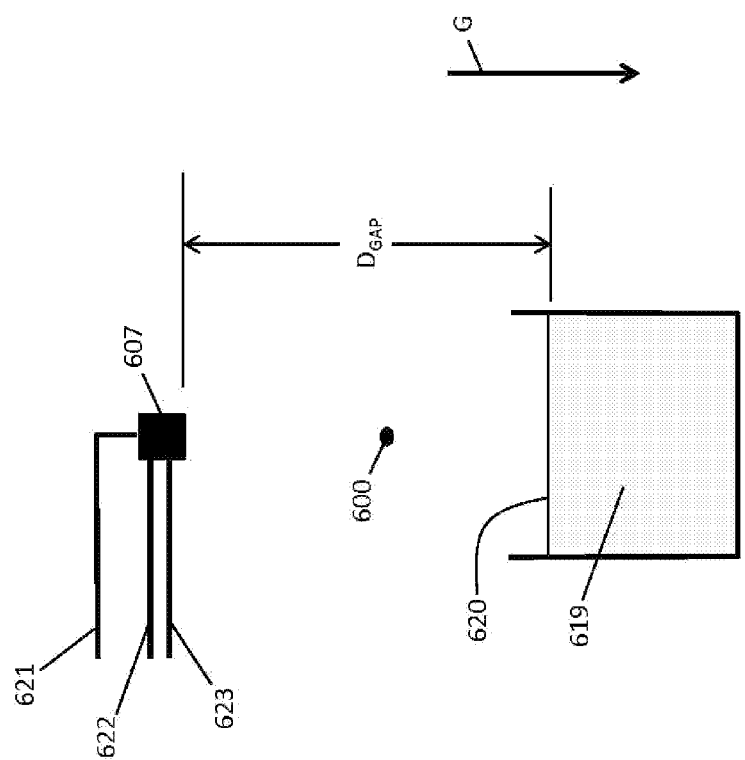
FIG. 6 illustrates a wet-dry methodology for fabrication of a fabricated hollow microsphere.

In an embodiment, nascent hollow microspheres are formed using a triple orifice nozzle and allowed to fall through an air gap and impact the coagulation bath, in order to expose the nascent hollow microsphere to the gaseous environment and cause immersion of the vitrified hollow microsphere in the coagulation bath. This is illustrated at FIG. 6. At FIG. 6 a pressurized stream of core fluid enter triple orifice nozzle 607 at 621, a pressurized stream of polymer dope enters at 622, and a pressurized gaseous stream enter at 623. Triple orifice nozzle 607 is configured similarly to triple orifice nozzle 407 and 507, and so that core fluid issues from the central bore at a core fluid flow rate, polymer dope issue from the first annulus at a polymer dope flow rate, and the gaseous stream issues from the second annulus at a gas flow rate. Additionally, the polymer dope flow rate is greater than the core fluid flow rate, and the polymer dope flow rate and gas flow rate are adjusted such that, following droplet detachment from triple orifice nozzle 607, nascent hollow microspheres such as nascent hollow microsphere 600 are generated. Nascent hollow microsphere 600 falls through a gaseous environment and in the direction of gravity vector G toward coagulation bath 619 having free surface 620.

Free surface 620 of coagulation bath 619 is displaced from triple orifice nozzle 607 by an air gap having a displacement $D_{GAP}$ parallel to the gravity vector G. The displacement $D_{GAP}$ represents a distance having a magnitude such that, following detachment from triple orifice nozzle 607, nascent hollow microsphere 600 falls through the gaseous atmosphere for at least 0.15 seconds and less than 0.5 seconds before impacting free surface 620 of coagulation bath 619, and immersing in the coagulation bath.

Producing nascent hollow microspheres, vitrified hollow microspheres, and subsequently fabricated hollow microspheres in this manner has the advantage of generating an impact force when the vitrified hollow microsphere impacts free surface 620 of coagulation bath 619. The impact tends to squeeze the vitrified hollow microsphere into a more oblate spheroid while maintaining the relatively contiguous nature of the outer skin. This can be advantageous in certain applications when the fabricated hollow microspheres are utilized as supports for gas absorbing liquids in gaseous environments. The more oblate spheroids produced through impact with the free surface of the coagulation bath may tend to have increased lifetimes over their more spherical counterparts when subjected to the typical pressure fluctuations present in the gaseous environments. This is particularly applicable when the fabricated hollow microspheres are utilized as supports for gas absorbing liquids in an absorption-desorption pressure swing type of gas separation.

Figure 7:
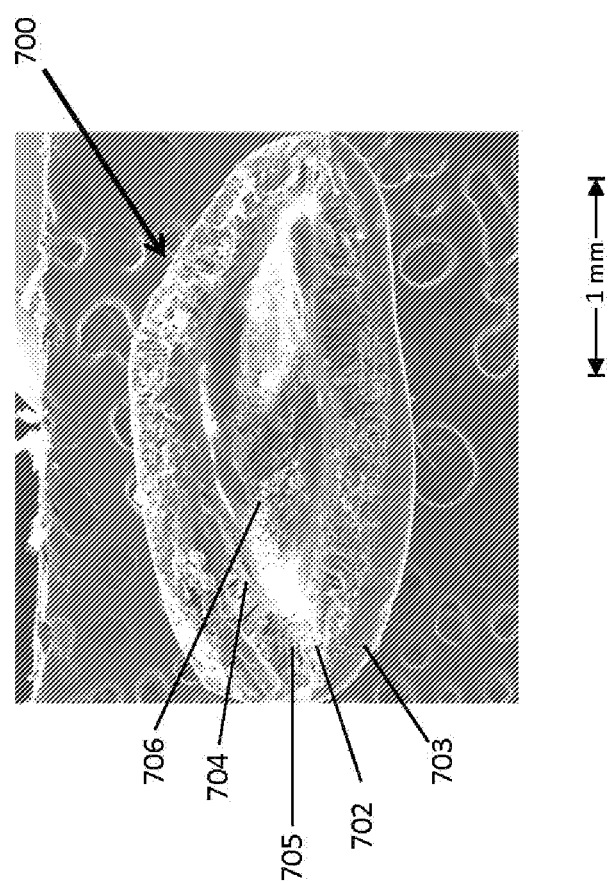
FIG. 7 illustrates a fabricated hollow microsphere.

A fabricated hollow microsphere is shown at FIG. 7 and generally indicated at 700. Fabricated hollow microsphere 700 is comprised of densified outer layer 703 surrounding a porous polymer network 702 comprised of pores, such as pore 705. Additionally, dense inner wall 704 generally separates the porous polymer network 702 from a hollow interior 706. The resulting geometry of fabricated hollow microsphere 700 results from interactions between the polymer dope, the core fluid, and the gaseous environment when the respective compositions, the total diameter of the nascent hollow microsphere, the inner diameter of the inner core diameter, the dope layer thickness relative to the inner core diameter, the exposure time to the gaseous environment, the kinetic diameter of the second non-solvent, and other specified factors of this disclosure are observed. The relatively oblate shape of fabricated hollow microsphere 700 results from the impact with a free surface of a coagulation bath, as earlier described. Relative dimensions of the fabricated hollow microsphere 700 depicted are indicated by the illustrated scale measurement, indicating a length of 1 millimeter (mm).

Following removal from the coagulation bath and subsequent removal of residual non-solvent by drying or other means known in the art, the fabricated hollow microspheres generated by this disclosure may be effectively utilized as liquid sorbent supports, when contact with a liquid sorbent such as an ionic liquid is desired for the separation of a chemical species from a mixture, and when the polymer utilized effectively transports the chemical species. For example, a fabricated hollow microsphere supporting an ionic liquid may be designed for the removal of $CO_2$ from a mixture such as a flue gas. When the ionic liquid has a varying sorption capacity for the chemical species as a function of temperature, the fabricated hollow spheroid supporting the ionic liquid may be exposed to the mixture at a first temperature and/or pressure, resulting in uptake of the chemical species from the mixture by the ionic liquid, followed by altering the temperature and/or pressure of the fabricated hollow spheroid to alter the sorption capacity and generate release of the chemical species from the ionic liquid. The fabricated hollow microspheres of this disclosure may be utilized as liquid sorbent supports by soaking the fabricated hollow microspheres in the liquid to be supported for a sufficient time. Alternatively, as discussed, an ionic liquid may be included in the core fluid or polymer dope, such that liquid-demixing in the coagulation bath immobilizes the ionic liquid within the porous polymer network of the fabricated hollow microspheres. Including the ionic liquid in the core fluid or polymer dope may be advantageous when the molar volume is roughly 300 $cm^3$/mol or more, or when the viscosity of the ionic liquid is greater than about 50 centipoise.

An advantage of the fabricated hollow spheroid disclosed here in the separation of a chemical species from a mixture lies in the high surface area to volume ratios achievable by immobilizing a liquid within the pores of a porous polymer network. As is understood in the art, a high surface area to volume ratio is desired when a liquid-gas contact facilitates absorption and selective removal of a species from a gas. A high availability of surface area contact relative to the volume of the absorbing liquid increases the kinetics of the absorption, and reduces the inventory of the absorbing liquid required. For this reason, it is advantageous to achieve the smallest feasible volume of the contacting liquid allowable. For example, in a spray tower operation, a droplet size between 500-1000 μm may be desired in order to balance the desired high surface-to-volume ratio while maintaining droplet size above that which might be entrained and carried out of the spray tower. An advantage of this disclosure is the ability to further reduce this limiting volume and further increase the kinetics by utilizing the porous polymer network of the fabricated hollow spheroid to immobilize an absorbing liquid and provide support against a gaseous flow, in order to mitigate loss of the liquid in the operating environment. The disclosure thus provides a mechanism by which contact between a gaseous flow and an immobilized liquid may be facilitated in a manner which allows reduced immobilized liquid volumes over those which might otherwise be achievable. This advantage becomes of greater significance when the immobilized liquid is a relatively high viscosity liquid such as a typical ionic liquid, where pumping costs may be significant and achieving sufficient reduced droplet sizes may be problematic.

In terms of material selection for production of fabricated hollow spheroids intended to utilize ionic liquids for a separation of a specific chemical species, it may be advantageous to initially choose the ionic liquid based on its solubility and solubility selectivity for the specific chemical species relative to other components which may be in a mixture, as well as the thermal and chemical stability of the ionic liquid over expected temperatures and pressures of operation. Based on the ionic liquid selected, compatible polymers may then be identified, based on poor solubility with the identified ionic liquid and thermal, chemical, and mechanical stability in the temperature range of the targeted application, among other possible considerations. Ideally, the polymer will also have a high solubility and diffusivity for the specific chemical species to facilitate transport into the fabricated hollow spheroid. The solvent may then be chosen based on the polymer and ionic liquid, and should readily dissolve both the polymer and ionic liquid. Finally, the nonsolvent may be chosen based on the other components. It should be miscible with the solvent, but should have poor solubility for both the polymer and the ionic liquid. Ideally, the nonsolvent is also cheap and non-toxic, since it may be required in larger amounts than any of the other components.

As an example, when selecting materials for production of $CO_2$-selective fabricated hollow spheroids, and speaking generally, the ionic liquid may be chosen first based on its performance in $CO_2$ capture. For capture from flue gas, the ionic liquid should preferably have a $CO_2$ solubility comparable to or greater than that of monoethanolamine, and a solubility selectivity for $CO_2$ over $N_2$ and $O_2$ preferably exceeding 20. Additionally, thermal and chemical stability as quantified by thermogravimetric analysis decomposition onset temperature should preferably exceed 150° C., and the energy required for $CO_2$ removal from the ionic liquid should preferably be less than 25 kcal/mol. For capture from fuel gas mixtures, including synthesis gas and raw natural gas, the ionic liquid should preferably have $CO_2$ solubility comparable to or greater than that of polyethylene glycol dimethyl ether, and the solubility selectivity for $CO_2$ over $H_2$ and $CH_4$ should preferably exceed 20. Further, thermal and chemical stability as quantified by thermogravimetric analysis decomposition onset temperature should preferably exceed 100° C., and the energy required for $CO_2$ removal from the ionic liquid should preferably be less than 15 kcal/mol. As before, and based on the specific ionic liquid selected, a compatible polymer may then selected based on thermal, chemical, and mechanical stability in the temperature range of the targeted application, and based on poor solubility with the selected ionic liquid. Ideally, the polymer has high solubility and diffusivity for $CO_2$ to facilitate transport into the hollow spheroid. Finally, the solvent is chosen based on the polymer and ionic liquid. The solvent must readily dissolve both the polymer and ionic liquid, and preferably it should also be relatively non-volatile, with a normal boiling point of 100-250° C.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method for making a fabricated hollow microsphere comprising:
    forming a nascent hollow microsphere having a total diameter greater than about 200 microns and less than about 3000 microns, where the nascent hollow microsphere is comprised of,
        an inner core having a spheroid shape, where the inner core has an inner core diameter, and where the inner core is comprised of a core fluid, where the core fluid is comprised of a first non-solvent and greater than about 80 wt. % of a first solvent, where the first solvent is miscible with the first non-solvent;
        a dope layer surrounding the inner core, where the dope layer has a layer thickness greater than about 10% and less than about 50% of the inner core diameter, and where the dope layer has a viscosity less than about 40 poise at 25° C., and where the dope layer is comprised of a polymer dope, where the polymer dope is comprised of from about 8 wt. % to about 25 wt. % of a polymer and from about 65 wt. % to about 87 wt. % of a second solvent and from about 5 wt. % to about 10 wt. % of a volatile, where the volatile has a vapor pressure greater than about 100 mm Hg at 25° C., and where the polymer is poorly soluble in the first non-solvent, and the polymer is soluble in the second solvent, the first solvent, and the volatile, and the second solvent is miscible with the first non-solvent and the first solvent, and the second solvent is miscible with the volatile;
    exposing the nascent hollow microsphere to a gaseous environment for at least 0.15 seconds and less than 0.5 seconds, where the gaseous environment is inert relative to the dope layer, and where a partial pressure of the volatile in the gaseous atmosphere is less than the vapor pressure of the volatile, thereby forming a vitrified hollow microsphere; and
    immersing the vitrified hollow microsphere in a coagulation bath, where the coagulation bath is comprised of a second non-solvent, where the polymer is poorly soluble in the second non-solvent, and where the second non-solvent is miscible with the first solvent and the second solvent, and where the second non-solvent has a kinetic diameter less than about 0.5 nm, thereby forming the fabricated hollow microsphere.

2. The method of claim 1 where a ratio of the wt. % of the second solvent in the core fluid to the wt. % of the solvent in the polymer dope is greater than about 1.05.

3. The method of claim 2 where the polymer is a polyimide or a polyamide-imide.

4. The method of claim 1 where the second solvent is comprised of the first solvent, and where the second non-solvent is comprised of the first non-solvent.

5. The method of claim 1 where the first non-solvent and the second non-solvent are water.

6. The method of claim 1 where the core fluid is further comprised of less than about 25 wt. % of an ionic liquid, where the polymer is poorly soluble in the ionic liquid.

7. The method of claim 1 further comprised of forming the nascent hollow microsphere by:
    issuing a stream of the core fluid through a central bore at a core fluid flow rate;
    issuing an annular stream of the polymer dope through a first annulus at a polymer dope flow rate, where the first annulus surrounds the central bore, and where the polymer dope flow rate is greater than the core fluid flow rate;
    issuing a gaseous stream through a second annulus at a gas flow rate, where the second annulus surrounds the first annulus, and where the gaseous stream is comprised of less than 0.001% total moisture; and
    adjusting the polymer dope flow rate and the gas flow rate such that the core fluid and the polymer dope form a droplet having a diameter greater than about 200 microns and less than about 3000 microns, where the droplet has the dope layer having the layer thickness greater than about 10% and less than about 50% of the inner core diameter, thereby forming the nascent hollow microsphere.

8. The method of claim 7 further comprised of exposing the nascent hollow microsphere to the gaseous environment for at least 0.15 seconds and less than 0.5 seconds and immersing the vitrified hollow microsphere in the coagulation bath by:
    dropping the nascent hollow microsphere through the gaseous environment over a gap distance, where the gap distance is a displacement having a magnitude such that the nascent hollow microsphere is exposed to the gaseous environment for at least 0.15 seconds and less than 0.5 seconds, thereby exposing the nascent hollow microsphere to the gaseous environment for at least 0.15 seconds and less than 0.5 seconds; and
    allowing the vitrified hollow microsphere to impact a free surface of the coagulation bath and sink in the coagulation bath, thereby immersing the vitrified hollow microsphere in the coagulation bath.

9. The method of claim 8 where the gaseous stream is further comprised of a solvent vapor, where the solvent vapor is comprised of a third solvent, and where the third solvent has a vapor pressure less than 0.6 millibar at 25° C.

10. The method of claim 8 where the polymer dope flow rate is at least 20 ml/h, and where the gas flow rate is at least 1 SLPM at a temperature of 25° C. and a pressure of 1 atmosphere.

11. The method of claim 8 where the second solvent is comprised of the first solvent, and where the second non-solvent is comprised of the first non-solvent.

12. The method of claim 11 where the first non-solvent and the second non-solvent are water.

13. The method of claim 11 where a ratio of the wt. % of the second solvent in the core fluid to the wt. % of the solvent in the polymer dope is greater than about 1.05.

14. The method of claim 8 where the central bore has a diameter between about 100 microns and about 500 microns, and where the first annulus has an inner diameter between about 350 microns and about 850 microns and an outer diameter between about 900 microns and about 1500 microns, and where the second annulus has an inner diameter between about 1100 microns and about 1700 microns and an outer diameter between about 1600 microns and about 2400 microns.

15. The method of claim 8 where the core fluid is further comprised of less than about 25 wt. % of an ionic liquid, where the polymer is poorly soluble in the ionic liquid.

16. A method for making a fabricated hollow microsphere comprising:
    issuing a stream of a core fluid through a central bore at a core fluid flow rate, where the core fluid is comprised of a first non-solvent and greater than about 80 wt. % of a first solvent, where the first solvent is miscible with the first non-solvent;

issuing an annular stream of a polymer dope through a first annulus at a polymer dope flow rate, where the first annulus surrounds the central bore, and where the polymer dope flow rate is greater than the core fluid flow rate, and where the polymer dope is comprised of from about 8 wt. % to about 25 wt. % of a polymer, from about 65 wt. % to about 87 wt. % of a second solvent, and from about 5 wt. % to about 10 wt. % of a volatile, and where a viscosity of the dope layer is less than about 40 poise at 25° C., and where the volatile has a vapor pressure greater than about 100 mm Hg at 25° C., and where the polymer is poorly soluble in the first non-solvent, the polymer is soluble in the second solvent, the first solvent, and the volatile, and the second solvent is miscible with the first non-solvent and the first solvent, and the second solvent is miscible with the volatile;

issuing a gaseous stream through a second annulus at a gas flow rate, where the second annulus surrounds the first annulus, and where the gaseous stream is comprised of less than 0.001% total moisture;

adjusting the polymer dope flow rate and the gas flow rate such that the core fluid and the polymer dope form a nascent hollow microsphere having a diameter greater than about 200 microns and less than about 3000 microns, where the nascent hollow microsphere is comprised of a dope layer comprised of the polymer dope surrounding an inner core comprised of the core fluid, where the inner core has an inner core diameter and the dope layer has a layer thickness greater than about 10% of the inner core diameter, thereby forming a nascent hollow microsphere;

dropping the nascent hollow microsphere through a gaseous environment over a gap distance, where the gap distance is a displacement having a magnitude such that the nascent hollow microsphere is exposed to a gaseous environment for at least 0.15 seconds and less than 0.5 seconds, where the gaseous environment is inert relative to the dope layer, thereby forming a vitrified hollow microsphere; and allowing the vitrified hollow microsphere to impact a free surface of a coagulation bath and sink in the coagulation bath, where the coagulation bath is comprised of a second non-solvent, where the polymer is poorly soluble in the second non-solvent, and where the second non-solvent is miscible with the solvent, and where the second non-solvent has a kinetic diameter less than about 0.5 nm, thereby immersing the vitrified hollow microsphere in the coagulation bath and thereby forming the fabricated hollow microsphere.

17. The method of claim 16 where the first non-solvent and the second non-solvent are water.

18. The method of claim 17 where the central bore has a diameter between about 100 microns and about 500 microns, and where the first annulus has an inner diameter between about 350 microns and about 850 microns and an outer diameter between about 900 microns and about 1500 microns, and where the second annulus has an inner diameter between about 1100 microns and about 1700 microns and an outer diameter between about 1600 microns and about 2400 microns.

19. The method of claim 18 where the polymer dope flow rate is at least 20 ml/h, and where the gas flow rate is at least 1 SLPM at a temperature of 25° C. and a pressure of 1 atmosphere, and where the gaseous stream is further comprised of a solvent vapor, where the solvent vapor is comprised of a second solvent, and where the second solvent has a vapor pressure less than 0.6 millibar at 25° C.

20. The method of claim 19 where the core fluid is further comprised of less than about 25 wt. % of an ionic liquid, where the polymer is poorly soluble in the ionic liquid.

* * * * *